US007904017B2

(12) United States Patent
Maron et al.

(10) Patent No.: US 7,904,017 B2
(45) Date of Patent: *Mar. 8, 2011

(54) PROCESS FOR AUTOMATED ASSESSMENT OF PROBLEM SOLVING SKILL

(76) Inventors: Mel Maron, Louisville, KY (US); Troy E. Howe, Louisville, KY (US)

( * ) Notice: Subject to any disclaimer, the term of this patent is extended or adjusted under 35 U.S.C. 154(b) by 1567 days.

This patent is subject to a terminal disclaimer.

(21) Appl. No.: 11/080,566

(22) Filed: Mar. 16, 2005

(65) Prior Publication Data

US 2006/0210957 A1 Sep. 21, 2006

(51) Int. Cl.
*C09B 11/00* (2006.01)
(52) U.S. Cl. .................. 434/362; 434/353; 434/188
(58) Field of Classification Search ............ 434/353, 434/118, 323, 350, 362, 188
See application file for complete search history.

(56) References Cited

U.S. PATENT DOCUMENTS

| | | | | |
|---|---|---|---|---|
| 6,018,617 A * | 1/2000 | Sweitzer et al. | ............. | 358/1.15 |
| 6,925,601 B2 * | 8/2005 | Moore et al. | .................. | 715/707 |
| 2003/0207246 A1 * | 11/2003 | Moulthrop et al. | ........... | 434/353 |
| 2004/0191746 A1 * | 9/2004 | Maron et al. | .................. | 434/323 |

* cited by examiner

*Primary Examiner* — Kathleen Mosser
(74) *Attorney, Agent, or Firm* — H. Jay Spiegel

(57) ABSTRACT

A process for using a computer to assess problem-solving skill includes a computer program that grades multi-step problems and is made aware of several different but equally valid formulas or methods that use answers to one or more prior steps to arrive at a correct answer to any problem step for which such choices exist. The user is allowed to submit answers, repeatedly if necessary, to any or all of a problem's steps, in any desired order, until all steps are either graded as correct or the correct answer was requested and given. A user's problem-solving skill level is assessed by compiling how many times answers to each step were submitted and on which Tries; if graded as correct, the Try on which credit was given and whether credit was given for a submitted answer, a submitted formula, or an unsubmitted answer for which prior-answer credit was given; if the correct answer was requested, the Try for which the request was made; and if hints are provided, a summary of their use. This data is stored and used to assess a user's skill level.

16 Claims, 2 Drawing Sheets

Figure 1  Grading Results for Try #2 (Answers Submitted for A2 and A5)

| Try 2: | Enter Answers Here | Read Grading Results and Hints Here | Get Answer or Hint Here |
|---|---|---|---|
| A1 | O | | Get Answer |
| A2 | O  2 | 2 is incorrect. | Hint 2 of 3 |
| A3 | C | CREDIT GIVEN (A5 correct). | Hint 1 of 2 |
| A4 | C | REQUESTED correct A4 is 1/15. | Answer Given |
| A5 | C  2.8 | 2.8 was graded as CORRECT. | Hint 1 of 2 |
| A6 | R | | Get Answer |

Figure 2  Skill-Level Assessment Data After Try #2

| | Summary of Activity for Each Step | Hints Used |
|---|---|---|
| A1 | 1 incorrect A3 (on Try #1). | 2 of 2 |
| A2 | 2 incorrect A2s (on Try #1 and #2). | 1 of 3 |
| A3 | 1 incorrect A3 (on Try #1), then CREDIT GIVEN (A5 correct). | 0 of 2 |
| A4 | 1 incorrect A4 (on Try #1), then ANSWER REQUESTED for Try #2. | 3 of 3 |
| A5 | Submitted A5 #1 GRADED AS CORRECT on Try #2. | 0 of 2 |
| A6 | 1 incorrect SA4 (on Try #1). | 1 of 1 |

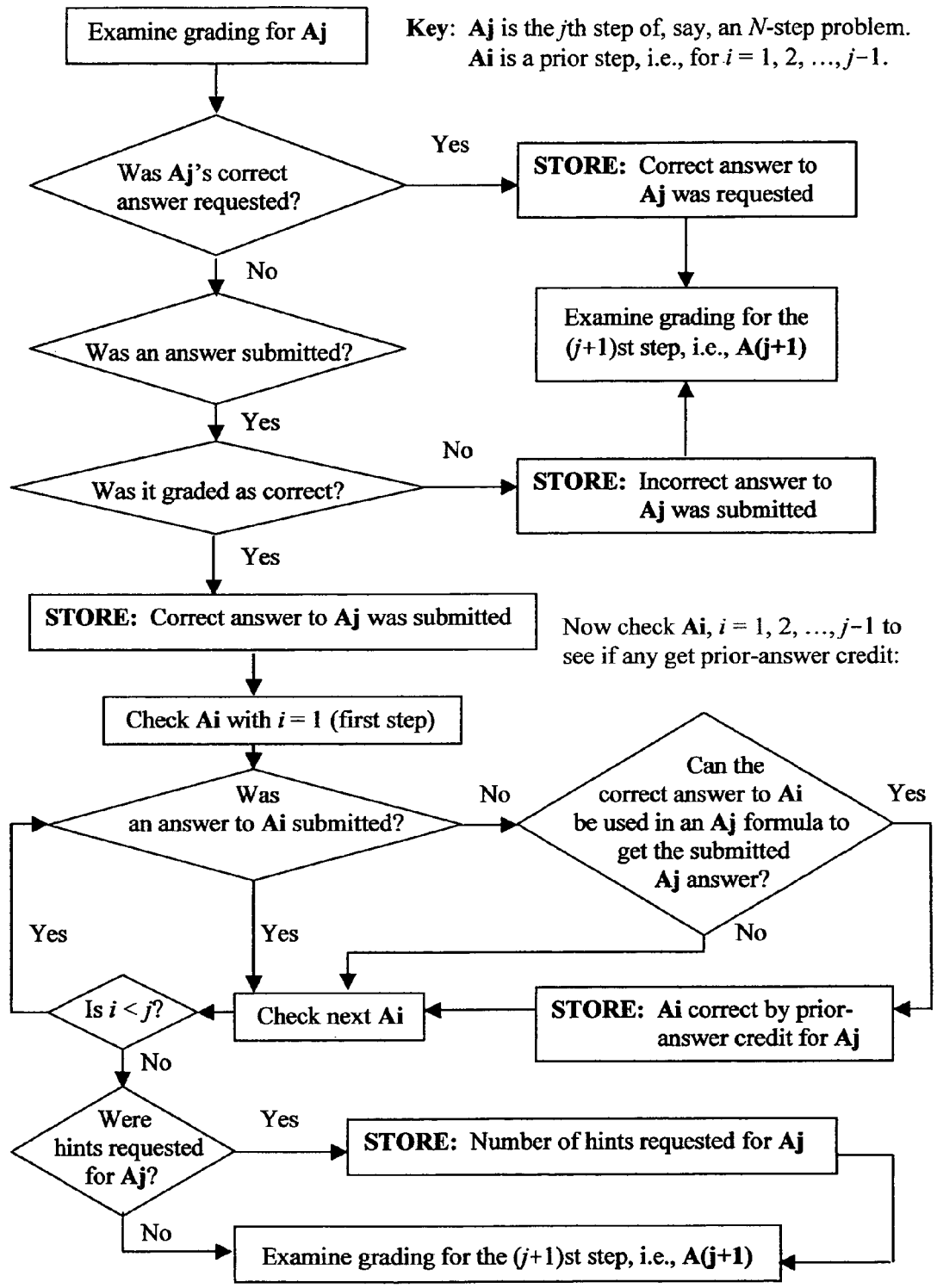
Figure 3 Data Stored After Grading Step $j$ of a Multi-Step Problem

PROCESS FOR AUTOMATED ASSESSMENT OF PROBLEM SOLVING SKILL

BACKGROUND OF THE INVENTION

The present invention relates to a process for automated assessment of the problem solving skill needed to solve the kinds problems that arise in mathematics, science, or technology. Such problems are formula based and have several steps such that the answer to at least one step can be obtained in at least one way by calculations that use calculated answers to one or more prior steps.

To manually grade such problems efficiently and in a way that fairly assigns partial credit, one looks for answers to key intermediate steps. If correct, then credit is given for all subordinate prior steps. If incorrect but reasonable, then an attempt is made to assign partial credit for its correct use in obtaining subsequent answers.

The invention in pending U.S. patent application Ser. No. 10/397,303, filed Mar. 27, 2003 discloses and claims a process whereby such fair, efficient grading of formula-based multi-step problems is performed by a computer via a web interface. This application was published on Sep. 30, 2004, as Publication No. US 2004/0191746 A1. Applicant herein is a co-inventor of the invention disclosed and claimed in the published patent application.

In the invention disclosed and claimed therein, memory is provided to store formula based multi-step problems, data to enable and facilitate assessment of the correctness of answers to the problem steps, and a computer program that uses these data to grade submitted answers. In the preferred embodiment, students using the system disclosed therein have access to the memory via a computer and a connection to a global computer network such as, for example, the INTERNET, and are thus able to access multi-step formula based problems and go through the steps necessary to solve them. Through communication via the global computer network, students submit answers to one or more selected problem steps to the computer program, which grades them and reports the results.

The earlier published application discloses a variety of grading strategies, including the prior and later answer strategies noted above. In the prior answer strategy, credit is given for prior steps having correct answers that were not submitted but needed in a correct calculation of a submitted answer that was graded as correct. In the later answer strategy, an incorrect submitted answer to a particular step is given credit if it could be obtained correctly from incorrect but reasonable submitted answers to one or more earlier steps.

The earlier published application also discloses various inventive ways to inform the student of progress made toward a complete solution after a set of submitted answers is graded. This information includes the problem steps that were graded as correct by virtue of the prior and later answer strategies as well as those for which correct answers were submitted. It also includes the specification of the minimal set of steps that are "required" in the sense that correct submitted answers to these steps will result in full credit for the problem.

The invention disclosed in the earlier published patent application permits complex problems with multi-step solutions to be graded effectively over a global computer network. However it lacks the capability to assess the skill level of the individuals that use it. Skill-level assessment that can rapidly and reliably identify students' strengths and weaknesses is critical to learning management and central to placing students in appropriate grade levels or courses.

To solve a complex problem, one must organize it into interrelated steps and then correctly carry out those steps. Methodologies for assessing problem-solving skill level therefore necessarily involve multi-step problems. Currently, problems used for such assessment are either solved by hand and graded manually or administered and graded on a computer. In the prior art in the latter case, the correct answer to any particular step is needed before answers to any subsequent step can be submitted. The requirement to submit answers to all steps in a pre-assigned sequence limits the ability to see how efficiently the student could have solved the problem without such constraints.

The present invention uses and improves the ability of the earlier invention to store heretofore-unavailable data, and uses these data to assess problem-solving skill level in a manner unknown in the prior art. Persons thus assessed are likely to be students, but may not be, and so will be referred to as users. Different users might take differing paths to solve the same problem, with some paths being more effective and indicative of higher levels of problem-solving skill based on some objective standard. Moreover, individuals using the same path might do so with different degrees of proficiency, as indicated by the number of submitted answer sets, the "required" vs. "optional" nature of the answers submitted on each set, and the number of times, if at all, that answers to the various problem steps were submitted before credit was given. Finally, as described herein, the preferred embodiment of the earlier invention enables automated error-locating assistance and answers in the form of strategy-describing formulas. Data describing the use of error-locating assistance and strategy-describing formulas is highly indicative of the skill level with which a problem was solved but is not available in the prior art.

SUMMARY OF THE INVENTION

The present invention relates to a process for using a computer to assess problem-solving skill. The present invention includes the following interrelated objects, aspects and features:

(1) Correct Method Awareness: The computer program grades multi-step problems and is made aware of several different but equally valid formulas or methods that use answers to one or more prior steps to arrive at a correct answer to any problem step for which such choices exist.

(2) Answer Entry Flexibility: Answers to the various steps can be numeric or symbolic, and the user is allowed to submit answers, repeatedly if necessary, to any or all of a problem's steps, in any desired order, until all steps are either graded as correct or the correct answer was requested and given.

(3) Minimal Required Answer Sets: In addition to being told which problem steps were graded as correct, the user is made aware of the minimal set of the remaining steps for which correct answers are required for full credit. The user can then choose to submit answers to any one or more required or optional steps. Users with strong skills will initially submit only required answers. Weaker users might prefer to submit answers to some optional steps as well or instead, to check the correctness of intermediate steps earlier.

(4) Prior-Answer Credit: If the answer to a particular step is graded as correct, then the computer program checks for correct prior-step answers that could have been used to get it, and gives credit for those prior steps for which answers were not submitted.

(5) Later-Answer Credit: An incorrect submitted answer will be graded as correct if it can be obtained by correct use of incorrect but reasonable submitted answers to prior steps.

(6) Math Error Location: If the submitted answer for a particular step is not graded as correct, then the grading program checks for dependence on prior steps and informs the user of prior steps where an error may have occurred.

(7) Formula Entry Option: Users can be allowed to enter formulas describing how they would use prior steps to arrive at an answer to a later step; if correct, the computer program grades it as correct, gives appropriate prior-answer credit, and uses the correct answer to grade later steps. Users with superior problem-solving skills will be more likely to use this highly rewarding option.

(8) Innovative Skill Level Assessment Data: With the word "Try" used to refer to a set of submitted answers, the data that is available to assess a user's problem-solving skill level includes for each step:

a) how many times an answer was submitted, and on which Tries;

b) if graded as correct, the Try on which credit was given and whether credit was given for a submitted answer, a submitted formula, or an unsubmitted answer for which prior-answer credit was given;

c) if the correct answer was requested, the Try for which the request was made; and d) if hints are provided, a summary of their use.

Accordingly, it is a first object of the present invention to provide a process for automated assessment of the problem solving skill of users.

It is a further object of the present invention to provide such a process in which assessment instruments are created using formula based multi-step problems for which a correct answer to at least one step can be obtained by at least one calculation that uses an answer to at least one prior step.

It is a yet further object of the present invention to provide such a process in which the grading computer program can access stored data that enables and facilitates assessment of correctness of submitted answers.

It is a yet further object of the present invention to provide such a process wherein data accumulated during grading may be stored to enable assessment of the skill levels of users.

It is a still further object of the present invention to provide such a process in which user skill level assessments may be provided to authorized parties.

These and other objects, aspects and features of the present invention will be better understood from the following detailed description of the preferred embodiment when read in conjunction with the appended figures.

BRIEF DESCRIPTION OF THE FIGURES

FIG. 1 gives a chart illustrating the reported grading results for a hypothetical second set of submitted answers (Try #2) in which answers to two steps were submitted.

FIG. 2 gives a chart illustrating the skill-level assessment data that is available after the grading.

FIG. 3 shows a flowchart depicting the manner of operation of the inventive method when grading one step of a set of submitted answers.

SPECIFIC DESCRIPTION OF THE PREFERRED EMBODIMENTS

The present invention is best understood in the context of pending U.S. patent application Ser. No. 10/397,303, filed Mar. 27, 2003, and of which Applicant is a co-inventor of the invention disclosed therein. The earlier application, as explained above, was published on Sep. 30, 2004, as Publication No. US 2004/0191746 A1. As explained above, the prior published patent application discloses and claims a process for computerized grading of formula based multi-step problems via a web interface. In the invention disclosed and claimed therein, memory is provided to store formula based multi-step problems, data to enable and facilitate assessment of the correctness of answers to the problem steps, and a computer program that uses these data to grade submitted answers. Formula based multi-step problems are stored in the memory and, concerning the problems, a complete solution requires calculation of at least one intermediate answer and then a subsequent calculation after the intermediate answer has been obtained to arrive at a complete solution to a such problem.

A computer program is provided to grade submitted answers to the various steps of each problem. Included in the program are formulas describing how correct solutions to some steps can be obtained from correct answers to prior steps, perhaps in several ways, and perhaps even using answers to different prior steps. In the preferred embodiment, students who use the system disclosed therein for grading have access to the memory via a computer and a connection to a global computer network such as, for example, the INTERNET. They are thus able to access such multi-step formula based problems and go through the steps necessary to solve them. Through communication via the global computer network, students submit answers to one or several problem steps to the computer program, which grades them and reports the results.

The earlier published application discloses a variety of strategies including a prior answer strategy and a later answer strategy. In the prior answer strategy, credit is given for prior steps having correct answers that were not submitted but needed in a correct calculation of a submitted answer that was graded as correct. In the later answer strategy, an incorrect submitted answer to a particular step is given credit if it could be obtained correctly from incorrect but reasonable submitted answers to one or more prior steps.

The earlier published application also discloses various inventive ways to inform the student of progress made toward a complete solution after a set of submitted answers is graded. This information includes the problem steps that were graded as correct by virtue of the prior and later answer strategies as well as those for which correct answers were submitted. It also includes the specification of the minimal set of steps that are "required" in the sense that correct submitted answers to these steps will result in full credit for the problem.

The invention disclosed in the prior published patent application is a quite effective tool in permitting mathematics examinations to be conducted over a global computer network so that students are not required to sit in the same classroom as one another to take such exams.

The invention disclosed in the earlier published patent application permits complex problems with multi-step solutions to be graded effectively over a global computer network. However it lacks the capability to assess the skill level of the individuals for whom the grading is performed. Thus, for example, two students may have taken different amounts of time to complete the same problem or, even if they took the same amount of time, may have used distinctly different formulas or methods for calculating the answers were graded as correct.

Rapid, reliable assessment that can identify and then either rank or aggregate by skill level is critical to learning management and central to placing individuals in appropriate grade levels, courses, or positions. For the kinds of complex problems that arise in math, science, and technology, appropriate assessment of problem-solving skill requires the use of multipart problems. The invention disclosed in the earlier patent application, again, fails to discern the level of problem-solving skill reflected in a given complete solution. It is this shortcoming in the prior invention that is the subject of the present patent application.

The process described herein uses a computer to grade multi-step problems. Answers to the various steps can be numeric or symbolic, and the user is permitted to submit answers, repeatedly if necessary, to any or all of a problem's steps, in any desired order, until all steps are graded as correct. For any step, users with low skill levels have the option of requesting hints that may be provided, and they always have the option of requesting the correct answer if available hints fail to help them get a correct answer.

The key to enabling both this answer-entry flexibility and the resulting innovative problem-solving assessment is making the grading program aware of several different but equally valid ways to use answers to one or more prior steps to arrive at a correct answer to a given problem step when such choices are possible.

The following simple six-step problem will be used to illustrate both the grading and the resulting acquisition of heretofore-unavailable assessment data:

Sample Problem (Multiplying and Adding Fractions)
For fractions $a=¼$ and $b=⅓$ and integer $c=6$ find:
$A1=a+b$, $A2=ac$, $A3=bc$, $A4=ab$, $A5=ac+bc$, and $A6=ac+(a+b)c$.

Recognized Prior-Answer Usage:
$A5=A2+A3$;  $A5=cA1$;  $A6=2A2+A3$;  $A6=A2+cA1$; $A6=A2+A5$.

The student is told the minimal set of correct answers required for full credit and can submit and re-submit values for any one or more of $A1, \ldots, A6$ that are not yet graded as correct. The reported results of any set of submitted answers includes those of $A1, \ldots, A6$ for which credit was given, where to look for errors when credit was not given, and an updated minimal set of required correct answers, as described next.

Prior-Answer Credit: The Sample Problem's Recognized Prior-Answer Usage suggests that the correct answer for A6 implies knowledge of the correct answers to A2, A3, and A5 (hence A1 as well). If A6 is graded as correct, then the most generous partial-credit strategy is to give credit for those of A2, A3, and A5 that are unsubmitted but have correct answers which, when used in one of the three recognized formulas for A6, yield the value that is graded as correct. With this strategy, the Sample Problem initially requires submitted correct answers for only A4 and A6.

Math Error Location: If a submitted answer is wrong, then the user is told which possibly subordinate prior answers to check. For example, if only an incorrect A5 is submitted, then the user will be advised to check A1, A2 and A3, on which a correct A5 can depend. The user can then re-submit the same A5 along with some or all of A1, A2 and A3, to pinpoint where a mistake was made, and perhaps even to get this same A5 graded as correct by being given later-answer credit as described next.

Later-Answer Credit: An incorrect submitted answer will be graded as correct if it can be obtained by a recognized correct use of prior submitted intermediate answers that are wrong but reasonable. For the Sample Problem, if a user submits only an incorrect but reasonable (say, nonzero) A2 and an A5 that equals the submitted A2 plus the correct A3, then credit will be given for A5 and A3, but not for A2 (for which an incorrect answer was submitted) or A1 (because the correct A1 times c would result in the correct A5, which differs from the submitted A5). FIG. 1 shows how the grading results would be reported to the user after the second submitted answer set. It should be noted that manual grading can not realistically allocate later-answer partial credit with this kind of precision.

Answer-Entry Strategies: Before submitting any set of answers, the student is told the minimal set of $A1, \ldots, A6$ for which correct submitted answers will result in all problem parts being graded as correct. Highly skilled problem solvers will initially submit only "required" answers, which we observed above to be A4 and A6. Those less skilled might prefer to submit answers to some "optional" parts as well or instead, to check intermediate steps earlier.

Formula Entry Option: Users can be allowed to enter formulas like those given in the Recognized Prior Answer Usage, describing how they would use prior steps to arrive at an answer to a later step; if recognized, the computer program grades it as correct, gives appropriate prior-answer credit, and uses the correct answer to grade later steps. Users with superior problem-solving skills will be more likely to use this highly rewarding option.

Innovative Skill Level Assessment Data: With the word "Try" used to refer to a set of submitted answers, the available problem-solving data includes for each step:
how many times an answer was submitted, and on which Tries;
if graded as correct, the Try on which credit was given and whether credit was given for a submitted answer, a submitted formula indicating how the answer was obtained, or an unsubmitted answer for which prior-answer credit was given;
if the correct answer was requested, the Try for which the request was made;
if hints were provided, a summary of their use.

FIG. 2 shows the reported available skill-assessment data, including requests for hints and correct answers (for A4), for a user that submitted incorrect answers to A1, A2, A3 and A6 on the first try, and only A2 and A5 as described in Later-Answer Credit above on the second try. In the A5 report, ANSWER could also have been FORMULA #1.

After just two tries, the data in FIG. 2 clearly indicates a user with limited skills for solving this kind of problem. When such data is aggregated and analyzed for a suitable collection of formula based multi-step problems and a cohort of students, the analysis will effectively rank individual skill levels and/or group them by course or grade-level readiness, and will do so with precision that is evident to, and appreciated by, those of ordinary skill in the art.

The skill level being assessed will determine what constitutes a suitable set of formula based multi-step problems, and perhaps to some extent the criteria by which skill level is inferred from the data. However, in view of the breadth and detail of the problem solving skill-level data herein disclosed, the potential precision of the resulting analysis exceeds that which is possible using current computer-grading art and, moreover, this precision can be achieved upon grading far fewer formula based multi-step problems as herein disclosed.

In accordance with the teachings of the present invention, skill-level assessment is based on at least one formula based multi-step problem, typically a multiplicity of such problems, whereby the correct answer to each step involves a calculation, with at least one step having at least one calculation that involves answers to one or more prior steps. Memory means is provided that permits the storage of at least one such problem, including correct-calculation formulas for each step. Users will perform calculations in attempting to arrive at correct answers to the various steps and will submit answers to a grading program, also stored in the memory means, that uses the stored data to assess the correctness of the submitted answers and report the results to the users.

The provided grading program includes software such as is disclosed in the prior application Ser. No. 10/397,303, but having the additional capability to report error-locating information, accept answers in the form of solution-strategy formulas, and allow the user to accept hints or actual answers to one or more problem steps. The data resulting from this additional capability is especially relevant to skill-level assessment and is stored along with other grading activity data on the memory means for such assessment.

Skill level is assessed by requiring answers to one or more multi-step problems to be submitted to the grading program via the user interface, with at least one problem having at least one step with a recognized answer that can be obtained in at least one way from answers to one or more prior steps. To make most effective use of the process herein disclosed, a multiplicity of problems will include a multiplicity of such steps. The extensive, detailed data obtained in grading the submitted answers sets reflect both the calculations employed by each user in arriving at the submitted answers and the competency with which they were performed. Subsequent analysis of these data will reveal the skill level of respective users.

The assessments of individual user's skill level may be combined together to provide a hierarchal ranking of a plurality of students based upon their relative skill levels. This ranking may be stored for any desired purpose. In addition, a display device may be provided that allows skill-level assessments to be viewed, and if necessary, transmission means and associated memory means can be provided to allow transmission of assessments to appropriate interested parties such as, for example, the users themselves, their parents or guardians, learning or employment institutions to which they have applied for admission or a job, etc.

The computer program that grades submitted answers is programmed to allocate maximum partial credit for any given set of submitted answers. It accomplishes this by using the prior and later answer strategies and providing updated minimal sets of problem parts that if correctly answered will result in grading of an entire problem as correct, as disclosed in the pending earlier application. The stored summary of the user's submitted answer history provides unique insight into both the strategies used and competency with which they were carried out. Such data, not possible using current computer-grading art, is of great value for skill-level assessment. Users with the strongest skill levels will usually get full credit by submitting only one answer set consisting of only the initially required answers. On the other hand, those with weaker skill levels will require more submitted sets, with more repeatedly submitted optional and required answers, and will rely more on hints and requests for correct answers. Of course, the present invention includes an assessment analysis that assesses skill level downward as the number of repeated answer submissions, hints, and requests for answers increases.

The additional features of the grading program disclosed herein considerably enhance the effectiveness of the grading data for the purpose of assessing skill level. The data enhancement includes how effectively the user exploited being informed of intermediate answers to check for errors and how frequently answers were entered as strategy-descriptive formulas. Users with stronger skill levels will make greater use of strategy-descriptive formulas and will benefit from the intermediate-answer information without need for additional hints.

Based upon the above description, FIG. 3 explains how the inventive method is operable to facilitate assessment of skill level of users by compiling for each set of submitted answers data regarding correct answers to steps of problems, incorrect answers to steps of problems, prior-answer credit, request and receipt of hints, and any other criteria useful in assessing skill level. The flowchart of FIG. 3 clearly explains to one of ordinary skill in the art how software is devised in accordance with the teachings of the present invention to facilitate skill assessment of users.

As such, an invention has been disclosed in terms of preferred embodiments thereof, which fulfill each and every one of the objects of the invention and provide a new and useful process for automated assessment of problem solving skill of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A method of analyzing skill level of a user solving formula-based multi-step problems, including the steps of:
   a) creating a test including at least one formula-based multi-step problem for which a correct answer to at least one step can be obtained in at least one way by a calculation that uses an answer to at least one prior step;
   b) providing memory means for:
      i) storing said at least one problem;
      ii) storing formulas for said at least one way to calculate a correct answer to said at least one step using said answer to said at least one prior step;
      iii) storing data to enable and facilitate assessment of correctness of sets of submitted answers to any or all problem steps; and
      iv) storing grading result data that enables assessment of said skill level;
   c) providing a computer program capable of using said stored formulas to grade said sets of submitted answers by said user and storing said skill-level assessment data;
   d) providing a user interface with selective access to said memory means and said computer program;
   e) providing a global computer network with which said user interface can be connected to said memory means and said computer program;
   f) administering said test using said memory means, said computer program, said user interface and said global computer network, said administering step including the steps of:
      i) requiring said user to submit, possibly repeatedly, sets of submitted answers into said user interface, said sets of submitted answers including at least one answer to said at least one step to solve said at least one problem;
      ii) grading said sets of submitted answers to said at least one problem, said grading including use of said stored formulas to analyze said sets of submitted answers and said calculations or processes employed in arriving at said sets of submitted answers; and
      iii) from said analysis, storing data that can be used to assess said skill level.

2. The method of claim 1, wherein said at least one problem comprises a plurality of problems.

3. The method of claim 2, wherein said at least one calculation comprises a plurality of calculations.

4. The method of claim 1, wherein said at least one calculation comprises a plurality of calculations.

5. The method of claim 3, wherein said at least one prior step comprises a plurality of prior steps.

6. The method of claim 1, wherein said at least one prior step comprises a plurality of prior steps.

7. The method of claim 1, conducted to analyze skill level of a plurality of users, including the step of storing submitted answer set grading result data usable to assess skill level for each of said plurality of users.

8. The method of claim 7, further including the step, after said submitted answer set grading result data storing step, of providing an assessment computer program to:
 a) use said stored submitted answer set grading result data to assess skill level of each user;
 b) provide an assessment of skill level of each user;
 c) hierarchically rank or group said students based upon said skill-level assessments; and
 d) store said hierarchical ranking or grouping.

9. The method of claim 8, further including the steps of:
 a) providing a display device;
 b) displaying said assessments on said display device;
 c) providing transmission means associated with said memory means; and
 d) transmitting said assessments to appropriate interested parties.

10. The method of claim 1, further including the steps of:
 a) programming said computer program to grade sets of submitted answers to give maximum deserved partial credit by
 b) advising said student of a minimal set of problem steps that, if correctly answered, will complete grading of the problem;
 c) giving credit for prior problem steps having correct answers that, although unsubmitted, would have to have been employed by said student to obtain a subsequent answer for which credit was given;
 d) giving credit for an answer that is incorrect but could have been obtained correctly from incorrect but feasible submitted answers to prior problem steps; and
 e) programming said computer program to enable grading of submitted answers that show explicitly how prior problem steps were used.

11. The method of claim 8, wherein said assessment computer program includes analysis of a number of submitted answers for each problem step.

12. The method of claim 11, further including analysis of whether answers for which credit was given were submitted or unsubmitted, and if submitted, whether correct or incorrect.

13. The method of claim 12, wherein said analysis further includes analysis of said submitted answers that show explicitly how prior problem steps were used.

14. The method of claim 13, wherein said analysis further includes analysis of how many correct answers or hints, if any, were requested and given.

15. The method of claim 14, wherein said analysis further includes analysis of how many correct answers, if any, were requested and given.

16. A method of analyzing skill level of a user solving formula-based multi-step problems, including the steps of:
 a) creating a test including a plurality of formula-based multi-step problems for which, for each problem, a correct answer to at least one step can be obtained by calculations that use an answer to at least one prior step;
 b) providing memory means for:
  i) storing said at least one problem;
  ii) storing formulas for at least one correct calculation, at least one calculation involving one or more alternative said prior-step answers that may be graded as correct, said at least one calculation being undertaken by said user in attempting to arrive at said correct answer to said at least one prior step;
  iii) storing data to enable and facilitate assessment of correctness of submitted answers; and
  iv) storing data to enable assessment of said skill level;
 c) providing a computer program capable of grading said answers by said user and storing said skill-level assessment data;
 d) providing a user interface with selective access to said memory means and said computer program;
 e) providing a global computer network with which said user interface can be connected to said memory means and said computer program;
 f) administering said test using said memory means, said computer program, said user interface and said global computer network, said administering step including the steps of:
  i) requiring said user to submit answers into said user interface, said submitted answers including at least one answer to said at least one step to solve said at least one problem;
  ii) grading said submitted answers, said grading including analysis of said sets of submitted answers and analysis of calculations or processes employed in arriving at said submitted answers; and
  iii) from said analysis, storing data that can be used to assess said skill level.

* * * * *